UNITED STATES PATENT OFFICE.

JAMES A. WHITCOMB, OF WASHINGTON, DISTRICT OF COLUMBIA.

PROCESS OF MAKING SWEET-POTATO FLOUR.

SPECIFICATION forming part of Letters Patent No. 310,927, dated January 20, 1885.

Application filed February 2, 1884. (No specimens.)

*To all whom it may concern:*

Be it known that I, JAMES A. WHITCOMB, a citizen of the United States, residing at Washington, District of Columbia, have invented certain new and useful Improvements in Processes of Preparing Sweet Potatoes; and I do declare the following to be a full, clear, and exact description of the invention, such as will enable others skilled in the art to which it appertains to make and use the same.

My invention relates to an article of food consumption made from the sweet potato; and the novelty consists in the steps taken in the process by which the result is attained, and in the article as a merchantable commodity, as will be hereinafter more fully set forth, and specifically pointed out in the claim.

The object of the invention is to produce a wholesome and nutritious article of diet from the sweet potato, one that will not be liable to become frozen or decayed, and which shall embody all the valuable portions of the potato, essentially the starch and saccharine matter.

In southern portions of the temperate zones the sweet potato grows plentifully with but little cultivation, and is consequently in such localities cheap and common. In other portions of the country—that is to say, in localities where different temperatures and different degrees of moisture of the air obtain—the potato is a luxury, and when in the natural state is difficult to get except at exorbitant prices, owing to its liability to rot and freeze. This invention designs to so treat the potato that the starchy and saccharine matters, with a quantity of the glutinous portion, may be obtained and readily transported to any portion of the world as a staple product, similar to flour, and it being well known that the chemical changes which accrue to the liquid portion of the potato in climates other than where it grew destroy its natural flavor, an essential feature of the process is to quickly evaporate such liquids while the potato is in a healthy condition, and reduce it to a flour or meal which will retain the natural flavor of the esculent. The product obtained according to my invention may be made into puddings, pies, cakes, custards, and the like, and is preferably prepared with salt, &c., before being placed upon the market. Being in the form of a flour or meal, it will keep for a long time in the manner of corn-starch or ordinary flour. The sweet potato is naturally an enlargement of a root, and has longitudinal fibers of a woody nature. The skin and the adjacent portion is largely composed of gluten. These portions are separated from the starchy and saccharine portions, according to my invention, and may form such another quality of diet material upon being properly ground.

In carrying out my invention I take the sweet potatoes in quantity and subject them to heat, preferably in moving ovens, so as to obtain an evenness of the baking process. This congeals the gluten near the skin and causes the skin to shrivel and separate itself from the main portion. The skin is then removed, in any preferable manner or by any preferred machinery, and the main portions are again subjected to heat to evaporate the moisture. This being done and the bulbs crushed, the longitudinal fibers will be in a condition to be separated by screening or otherwise, when the starchy and saccharine portions are ready to be ground, crushed, or othwise formed into a flour, treated with salt and yeast-powder, and packed for the market, having been dispossessed of all moisture, but retaining the desirable natural elements. The steps which are the gist of this process are, first, baking to separate the skin, then drying or evaporating, then separating the fiber, then preparing into flour. Modifications in the details of these steps may be made without departing from the principle or sacrificing the advantages of my invention.

I am aware of United States Patent No. 4,337, of December 31, 1845, and therefore lay no claim to the invention therein described.

What I claim as new is—

The process herein described for obtaining an esculent from the sweet potato, consisting in first baking to separate the skin, then removing the said skin, then evaporating off the moisture, then separating the fiber, and finally preparing the residual starchy and saccharine matters into a flour for market, as set forth.

In testimony whereof I affix my signature in presence of two witnesses.

JAMES A. WHITCOMB.

Witnesses:
JOSEPH FORREST,
W. H. H. KNIGHT.